United States Patent Office 3,046,298
Patented July 24, 1962

3,046,298
BICYCLO-[2,2,1]-HEPTANE HYDRAZINE DERIVATIVES
Hartmund Wollweber, Rudolf Hiltmann, Wolfgang Wirth, and Horst Kreiskott, all of Wuppertal-Elberfeld, Germany, assignors to Farbenfabriken Bayer Aktiengesellschaft, Leverkusen, Germany, a corporation of Germany
No Drawing. Filed Sept. 27, 1960, Ser. No. 58,657
Claims priority, application Germany Sept. 30, 1959
5 Claims. (Cl. 260—463)

It has been found that bicyclo alkyl- or tricyclo alkyl hydrazines of the general formula

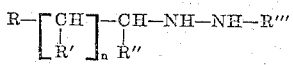

are distinguished by their strong stimulating effect. In the formula R' and R'' represent hydrogen or alkyl radicals containing up to 3 carbon atoms, R represents bicyclo heptyl or bicyclo heptenyl radicals which may be further substituted by alkyl radicals containing up to 3 carbon atoms, R''' is hydrogen or a carbalkoxy radical containing up to 3 carbon atoms in the alkyl portion or an acyl group and $n$ is 0 or 1.

For the production of hydrazines obtainable according to the invention all processes come into consideration which are suitable for the synthesis of primary aliphatic hydrazines.

Thus for example reactive esters such as hydrohalic acid, alkyl or aryl sulfonic acid esters of alcohols of the formula

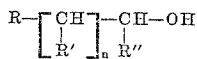

in which R, R', R' and $n$ have the aforesaid significance, can be reacted with hydrazine, acyl hydrazides or carbalkoxy hydrazines.

Alternatively, amines of the formula

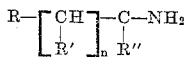

can be reacted with hydroxylamine-O-sulfonic acid.

Or, carbonyl compounds of the formula

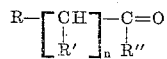

can be reacted with hydrazine or acyl hydrazides or with carbalkoxy hydrazines and reduced simultaneously or after isolation of the corresponding hydrazone. Furthermore, the acyl hydrazines of carbalkoxy hydrazines obtained can be hydrolyzed or the free hydrazines obtained can be converted into the β-acyl hydrazides or the carbalkoxy hydrazines by reaction of the corresponding esters such as carbonic acid esters, acetic ester, propionic ester, etc.

The free hydrazines are colorless liquids which may be best distilled without decomposition in vacuum under nitrogen. Upon standing in air they gradually decompose with splitting off nitrogen. The hydrazines produced according to the invention, their acyl or carbalkoxy derivatives, form with inorganic or organic acids well crystallised salts which dissolve in water. Salts of the free hydrazines are stable and may be stored in air without decomposition.

The hydrazine derivatives obtainable according to the invention as well as their salts possess valuable therapeutic properties. Thus, for example, the compounds obtainable according to Example 1, α-[1-(2-bicyclo-[2,2,1]-heptyl)-ethyl]-β-carbethoxyhydrazine (II) and 1-(2-bicyclo-[2,2,1]-heptyl)-ethyl hydrazine (I) in the stimulation of the "depressed" mouse and the golden hamster "depressed" by smelling substances, possess an activity five to six times stronger and in the anti-reserpine effect an activity at least equal to five times stronger than the commercial α-isopropyl-β-isonicotinoyl-hydrazine (III) as appears from the following table:

|     | Stimulation Mouse $D_{E50}$ mg./kg. | Stimulation Hamster $D_{E40}$ mg./kg. | Antireserpine action Hamster $D_{E50}$ mg./kg. |
|-----|-----|-----|-----|
| I   | 15  | 20  | 5   |
| II  | 20  | 25  | 25  |
| III | 100 | 100 | 25  |

Example 1

69 g. of 2-bicyclo-(2,2,1)-heptyl methyl ketone are heated under reflux in 200 ml. of benzene with 52 g. of hydrazine carboxylic acid ethyl ester until the theoretical quantity of water is separated out in the water separator. The solvent is then distilled off in vacuum and there are obtained 86 g. of 2-bicyclo-(2,2,1)-heptyl methyl ketone carbethoxy hydrazone, melting point 213–214° C.

21.2 g. of 2-bicyclo-(2,2,1)-heptyl methyl ketone-carbethoxy ethyl hydrazone are hydrogenated in 100 ml. of glacial acetic acid with 100 mg. PtO₂ at 20° C. The solvent is then distilled off in vacuum, the material taken up in ether, washed with potassium carbonate solution and there are obtained after distillation 19 g. of α-[1-(2-bicyclo-[2,2,1]-heptyl)-ethyl]-β-carbethoxy hydrazine, B.P. 130° C./0.2 mm. Hg, hydrochloride M.P. 161° C.

30 g. of the aforesaid compound are heated under reflux with a solution of 9 g. of caustic soda in 100 ml. of alcohol and 4 ml. of water overnight. The product is made weakly acid with hydrochloric acid, concentrated in vacuum, and ether and potash solution added to the residue. After distillation of the solvent the ether solution leaves behind 21 g. of 1-(2-bicyclo-[2,2,1]-heptyl)-ethyl hydrazine B.P. 114–115° C./12 mm. Hg, hydrochloride M.P. 115° C.

Example 2

75 g. of 1-(2-bicyclo-[2,2,1]-heptyl)-ethyl chloride, 70 g. of hydrazine hydrate, 250 ml. of dioxane are heated under reflux for 16 hours. The product is then acidified, all volatile components distilled off in vacuum followed by treatment with potash solution and etherification. After vaporisation of the solvent there are obtained 35 g. of 1-(2-bicyclo-[2,2,1]-heptyl)-ethyl hydrazine of B.P. 114–115° C./12 mm. Hg. The 1-(2-bicyclo-[2,2,1]-heptyl)-ethyl chloride used as starting material can be produced in the following way: 2-bicyclo-[2,2,1]-heptyl methyl ketone is catalytically reduced to 2-bicyclo-(2,2,1)-heptyl methyl carbinol of B.P. 89–90° C./13 mm. Hg and then converted with thionyl chloride into 1-(2-bicyclo-[2,2,1]-heptyl)-ethyl chloride of B.P. 70–74° C./12 mm. Hg.

Example 3

71 g. of 2-bicyclo-(2,2,1)-heptyl acetone are heated with 54 g. of hydrazine carboxylic acid ethyl ester to 80° C. for 1 hour. The 2-bicyclo-(2,2,1)-heptyl acetone carbethoxy hydrazone obtained, 121 g., crystallises out on cooling.

100 g. of 2-bicyclo-(2,2,1)-heptyl acetone carbethoxy hydrazine are hydrogenated with Raney-nickel as catalyst in 500 ml. of alcohol at 80–90° C. After distilling off the solvent there are obtained 84 g. of α-[2-(2-bicyclo-[2,2,1]-heptyl)-isopropyl]-β-carbethoxy hydrazine of B.P. 120–125° C./0.1 mm. Hg, hydrochloride M.P. 134–135° C.

74 g. of the aforesaid compound are hydrolysed according to the method described in Example 1. There are obtained 45 g. of 2-(2-bicyclo-[2,2,1]-heptyl)-isopropyl hydazine, of B.P. 128° C./12 mm. Hg, hydrochloride M.P. 150–151° C.

Example 4

31 g. of 1-(2-bicyclo-[2,2,1]-heptyl)-ethyl hydrazine are heated under reflux with 30 g. of carbonic acid diethyl ester in 100 ml. of alcohol for 10 hours. The product is then distilled in vacuum and there are obtained 35 g. of α-[1-(2-bicyclo-[2,2,1]-heptyl)-ethyl]-β-carbethoxy hydrazine of B.P. 130° C./0.2 mm. Hg, hydrochloride M.P. 160–161° C.

Example 5

100 g. of 2-bicyclo-(2,2,1)-hept-5-enyl methyl ketone are heated under reflux in 400 ml. of benzene with the calculated amount of hydrazine carboxylic acid ethyl ester until the theoretical quantity of water has separated out in the water separator. The solvent is then distilled off in vacuum and there are obtained 143.3 g. of 2-bicyclo-(2,2,1)-hept-5-enyl methyl ketone carbethoxy hydrazone.

To a solution of 55 g. of the aforesaid compound in 250 ml. methanol is dropped a solution of 20 g. of sodium boronhydride in 200 ml. of methanol. The reaction mixture is destroyed by adding of 200 ml. of water and 50 ml. of acetic acid. The solvent is then distilled off in vacuum, the material taken up in a concentrated solution of caustic soda and in ether. After distillation of the solvent the ether solution leaves behind the α-[1-(2-bicyclo-[2,2,1]-hept-5-enyl)-ethyl]-β-carbethoxy hydrazine phosphate M.P. 140° C.

The foresaid compound is heated under reflux with a solution of 7 g. of sodium in 100 ml. of alcohol and 8 ml. of water overnight. The product is made weakly acid with hydrochloric acid concentrated in vacuum, and ether and a concentrated solution of caustic soda added to the residue. After distillation of the solvent the ether solution leaves behind 10.2 g. of 1-(2-bicyclo-[2,2,1]-hept-5-enyl)-heptylethyl hydrazine B.P. 74–76° C./0.3 mm. Hg, phosphate M.P. 135–138° C.

We claim:
1. A chemical compound selected from the group consisting of 2-(2-bicyclo-[2,2,1]-heptyl)-isopropyl hydrazine; 1 - (2 - bicyclo-[2,2,1]-hept-5-enyl)-ethyl hydrazine; α - [1 - (2-bicyclo-[2,2,1]-heptyl)-ethyl]-β-carbethoxy hydrazine; and 1-(2-bicyclo-[2,2,1]-heptyl)-ethyl hydrazine.
2. The chemical compound, 2-(2-bicyclo-[2,2,1]-heptyl)-isopropyl hydrazine.
3. The chemical compound, 1-(2-bicyclo-[2,2,1]-hept-5-enyl)-ethyl hydrazine.
4. The chemical compound, α-[1-(2-bicyclo-[2,2,1]-heptyl)-ethyl]-β-carbethoxy hydrazine.
5. The chemical compound, 1-(2-bicyclo-[2,2,1]-heptyl)-ethyl hydrazine.

References Cited in the file of this patent

UNITED STATES PATENTS

| | | |
|---|---|---|
| 2,415,453 | Thomas | Feb. 11, 1947 |
| 2,806,851 | Sisler et al. | Sept. 17, 1957 |
| 2,831,027 | Pfister et al. | Apr. 15, 1958 |
| 2,920,994 | Epperly et al. | Jan. 12, 1960 |